United States Patent
Hsieh et al.

(10) Patent No.: US 11,029,560 B2
(45) Date of Patent: Jun. 8, 2021

(54) LIQUID CRYSTAL DISPLAY LIGHTING MODES

(71) Applicant: HEWLETT-PACKARD DEVELOPMENT COMPANY, L.P., Spring, TX (US)

(72) Inventors: Hsing-Hung Hsieh, Taipei (TW); Alexander Wayne Clark, Houston, TX (US); Ann Alejandro Villegas, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/479,250

(22) PCT Filed: Dec. 12, 2017

(86) PCT No.: PCT/US2017/065760
§ 371 (c)(1),
(2) Date: Jul. 19, 2019

(87) PCT Pub. No.: WO2019/117860
PCT Pub. Date: Jun. 20, 2019

(65) Prior Publication Data
US 2020/0319508 A1 Oct. 8, 2020

(51) Int. Cl.
*G02F 1/13357* (2006.01)
*G09G 3/36* (2006.01)

(52) U.S. Cl.
CPC ......... *G02F 1/133603* (2013.01); *G09G 3/36* (2013.01); *G09G 2320/0626* (2013.01); *G09G 2320/0666* (2013.01); *G09G 2360/144* (2013.01)

(58) Field of Classification Search
CPC ................... F21V 23/04; G02B 6/0068; G02F 2001/133626
USPC .................................................. 362/600–634
See application file for complete search history.

(56) References Cited

U.S. PATENT DOCUMENTS

| | | | |
|---|---|---|---|
| 9,305,505 B1* | 4/2016 | Seen | H04M 1/22 |
| 9,558,688 B2 | 1/2017 | Ando et al. | |
| 9,709,847 B2 | 7/2017 | Wolf et al. | |
| 2006/0268197 A1 | 11/2006 | Valliath et al. | |
| 2014/0029834 A1 | 1/2014 | Chen et al. | |
| 2014/0240341 A1 | 8/2014 | Oda | |
| 2015/0346525 A1* | 12/2015 | Wolf | F21V 23/04 362/614 |
| 2016/0358584 A1 | 12/2016 | Greenebaum et al. | |

FOREIGN PATENT DOCUMENTS

| CN | 106291789 A | 1/2017 |
|---|---|---|
| JP | 2017083580 A | 5/2017 |

* cited by examiner

*Primary Examiner* — William J Carter
(74) *Attorney, Agent, or Firm* — Brooks, Cameron & Huebsch PLLC (57) ABSTRACT

Example implementations relate to liquid crystal display (LCD) lighting modes. An example device can include an LCD, a wide gamut light-emitting diode (LED) light set to backlight the LCD, a narrow gamut LED light set to backlight the LCD and a controller communicatively coupled to the LCD. The controller can switch the LCD between a wide gamut lighting mode, a narrow gamut lighting mode, and a high brightness lighting mode in response to changes in ambient light and content displayed on the LCD.

13 Claims, 6 Drawing Sheets

LIQUID CRYSTAL DISPLAY LIGHTING MODES

BACKGROUND

A liquid crystal display (LCD) is a flat-panel display or other electronically modulated optical device that uses the light-modulating properties of liquid crystals. An LCD can use a backlight or reflector to produce images. An LCD can be used in computing device monitors, televisions, instrument panels, and signage, among others.

DETAILED DESCRIPTION

Light emitting diodes (LED) can be used to backlight an LCD and can produce to a wide color gamut display or a narrow color gamut display. LEDs for a wide color gamut display can also consume higher power than LEDs for narrow color gamut display. A wider color gamut or brightness level may be desired when using particular applications (e.g., photo editing applications) or during outdoor use (e.g., increased reflection). A lower color gamut or brightness level may be desired when power savings are desired.

Some approaches to switching LCD lighting modes can include increasing a driving current or voltage of an LED backlight. Such an approach can damage and degrade the LED backlight, resulting in a shortened lifetime. Other approaches can include using a predetermined LED lighting mode or level or using multiple of a same type of LED light, such as two narrow gamut LED lights or two wide gamut LED lights. Such approaches may not allow for a plurality of different lighting modes.

In contrast, some examples of the present disclosure can include an LCD that can be switched between a plurality of lighting modes including high brightness mode, wide color gamut mode, and narrow color gamut mode using a set of wide gamut LED lights and a set of narrow gamut LED lights. Some examples of the present disclosure can include switching the lighting modes in response to ambient lighting detection, content displayed on the LCD and/or an application running on a computing device communicatively coupled to the LCD. As used herein, "communicatively coupled" can include coupled via various wired and/or wireless connections between devices such that data can be transferred in various directions between the devices. The coupling need not be a direct connection, and in some examples can be an indirect connection.

In some instances, the switching can be performed automatically. As used herein, "automatically" can include being performed with limited or no user input and/or with limited or no prompting. In some examples of the present disclosure, LCD lighting modes can be controlled remotely and/or a user can adjust a lighting mode, for instance to conserve power.

Figure 1:
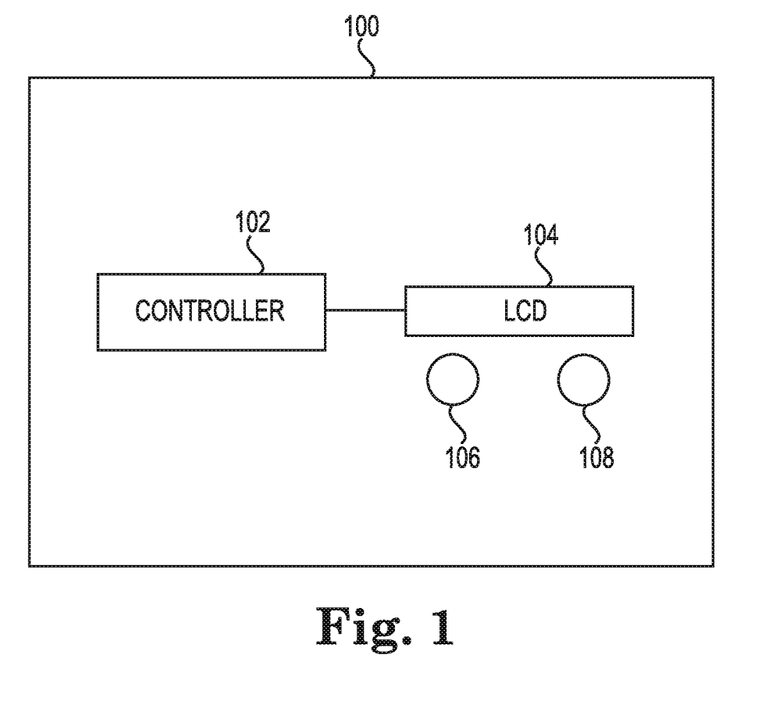
FIG. 1 illustrates a device for switching LCD lighting modes according to an example.

FIG. 1 illustrates a device 100 for switching LCD lighting modes according to an example. Device 100 can be a computing device in some examples. For instance, device 100 can include controller 102 communicatively coupled to LCD 104.

Controller 102 can be a combination of hardware and instructions for switching LCD lighting modes. The hardware, for example can include a processor and/or a memory resource (e.g., machine-readable medium (MRM), computer-readable medium (CRM), data store, etc.).

The processor, as used herein, can include a number of processors capable of executing instructions stored by a memory resource. Although the following descriptions refer to a single processor, the descriptions may also apply to a system with multiple processors.

The processor can be a central processing unit (CPU), a semiconductor based microprocessor, and/or other hardware devices suitable for retrieval and execution of instructions stored in non-transitory MRM. The processor can fetch, decode, and execute instructions. As an alternative or in addition to retrieving and executing instructions, the processor can include at least one electronic circuit that includes electronic components for performing the functionality of instructions.

The instructions (e.g., machine-readable instructions (MRI)) can include instructions stored on the memory resource and executable by the processor to implement a desired function (e.g., switching LCD lighting modes). The memory resource, as used herein, can include a number of memory components capable of storing non-transitory instructions that can be executed by the processor. The memory resource can be integrated in a single device or distributed across multiple devices. Further, the memory resource can be fully or partially integrated in the same device as the processor or it can be separate but accessible to that device and the processor. Thus, it is noted that the controller 102 can be implemented on an electronic device and/or a collection of electronic devices, among other possibilities.

The memory resource can be in communication with the processor via a communication link (e.g., path). The communication link can be local or remote to an electronic device associated with the processor. The memory resource can include engines to perform various functions described herein. The engines can include a combination of hardware and instructions to perform a number of functions described herein, and the instructions (e.g., software, firmware, etc.) can be downloaded and stored in a memory resource (e.g., MRM) as well as a hard-wired program (e.g., logic), among other possibilities.

LCD 104 can be backlit by a wide gamut LED light set 106 and/or a narrow gamut light set 108. Controller 102 can switch the LCD between a wide gamut lighting mode, a narrow gamut lighting mode, and a high brightness lighting mode in response to changes in ambient light and content displayed on the LCD. Content displayed on the LCD, for example, can include content associated with a particular application running on a computing device communicatively coupled to the LCD and/or a white content displayed on the LCD. For instance, as will be discussed further herein, user experience can be improved by using particular lighting modes with particular applications and/or white content.

As used herein, a wide gamut lighting mode includes the wide gamut LED light set turned on and the narrow gamut LED light set turned off. A wide gamut lighting mode can include the use of a wider range of colors and brightness levels as compared to a narrow gamut lighting mode. A narrow gamut lighting mode includes the narrow gamut LED light set turned on and the wide gamut LED light set turned off. A narrow gamut lighting mode can include a smaller range of colors and brightness levels as compared to a wide gamut lighting mode and may use consume less power than a wide gamut or high brightness lighting mode.

A high brightness lighting mode includes both the narrow gamut LED light set and the wide gamut LED light set turned on. A high brightness lighting mode can include a largest range of colors and brightness levels among the three aforementioned lighting modes. A high brightness lighting mode may also consume the most power of the three lighting modes.

In some examples a wide gamut brightness mode can include brightness levels above National Television System Committee (NTSC) levels of 72 percent or higher, and a narrow gamut brightness mode can include brightness levels below 50 percent or lower. The percentages can be set by a manufacturer, designer, user, or remotely set, in some examples. In some instances narrow versus wide gamut can be relative, such that wide gamut has a higher color saturation and/or brightness as compared to narrow gamut.

In some examples, controller 102 can be remotely managed. For instance, the lighting modes can be switched remotely (e.g., via a remote management service). In some examples, the device can have three lighting modes available, but may be provided to a user with one or two enabled. The third can be enabled remotely for a fee. For instance, a high brightness mode may be available to a user upon payment for the service. It can be enabled remotely. In some examples, a user may be unaware that the device has three lighting modes available, as the feature can be hidden from the user until remotely enabled. In other examples three modes can be available to the user upon receipt of the device.

For instance, users may be desire different LCD capabilities depending on their usage of the LCD. For instance, examples include a low brightness, low color gamut LCD configuration (e.g., office workers), a low brightness, high color gamut configuration (e.g., graphic artists), and a high brightness, high color gamut configuration (e.g., high end designers). The different configurations may all be available on the LCD, but may be enabled or disabled remotely depending on a user's contract.

FIGS. 2-5 illustrate arrangements of components of a device for switching LCD lighting modes according to an example. In such examples, a set or sets of LED lights can provide light to a light guide plate (LGP) which can redirect light to the LD such that a user can see light coming out of the LCD.

Figure 2:
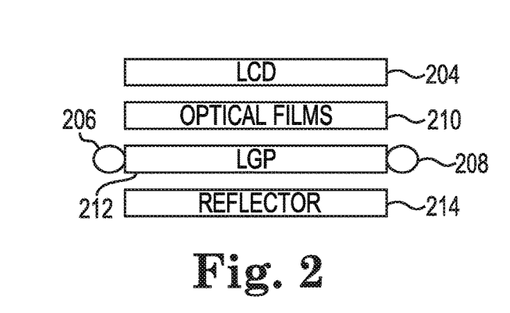
FIGS. 2-5 illustrate arrangements of components of a device for switching LCD lighting modes according to an example.

FIG. 2 illustrates an arrangement including an LCD 204 communicatively coupled to a backlight unit including a reflector 214, an LGP 212, optical films 210, a wide gamut LED light set 206 and a narrow gamut LED light set 208. In the example illustrated in FIG. 2, wide gamut LED light set 206 and narrow gamut LED light set 208 are located on different sides of the same LGP 212. This arrangement can allow for an easier implementation as compared to having LED light sets on a same side of an LGP and a thinner backlight unit (e.g., resulting in a thinner notebook computer, television, etc.) and lighter-weight backlight unit as compared to having multiple LGPs.

Figure 3:
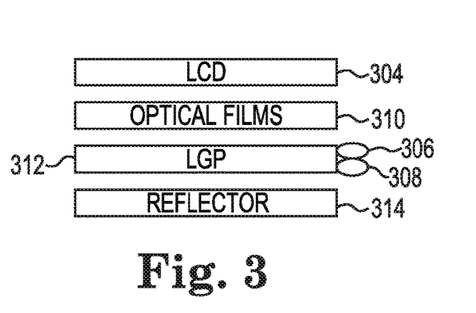

FIG. 3 illustrates another arrangement including an LCD 304 communicatively coupled to a backlight unit including a reflector 314, an LGP 312, optical films 310, a wide gamut LED light set 306 and a narrow gamut LED light set 308. In the example illustrated in FIG. 3, wide gamut LED light set 306 and narrow gamut LED light set 308 are located on a same side of the same LGP 312. This arrangement can allow for a thinner backlight unit (e.g.; resulting in a thinner notebook computer, television, etc.) and lighter-weight backlight unit as compared to having multiple LGPs as compared to having multiple LGPs. Such an arrangement can also allow for a smaller boarder around an LCD as compared to having LED light sets on different sides of an LGP.

Figure 4:
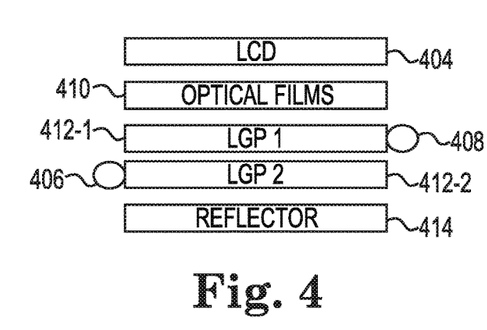

FIG. 4 illustrates another arrangement including an LCD 404 communicatively coupled to a backlight unit including a reflector 414, a first LGP 412-1, a second LGP 412-2, optical films 410, a wide gamut LED light set 406 and a narrow gamut LED light set 408. In the example illustrated in FIG. 4, wide gamut LED light set 406 and narrow gamut LED light set 408 are located on different sides of different LGPs. For instance, wide gamut LED light set 406 is on LGP 412-2 and located on a side opposite narrow gamut LED light set 408 located on LGP 412-1. In some examples they can be reversed. For instance, wide gamut LED light set 406 can be on LGP 412-1 and located on a side opposite narrow gamut LED light set 408 located on LGP 412-2. This arrangement can allow for an easier implementation as compared to having LED light sets on a same side of a single LGP or multiple LGPs.

Figure 5:
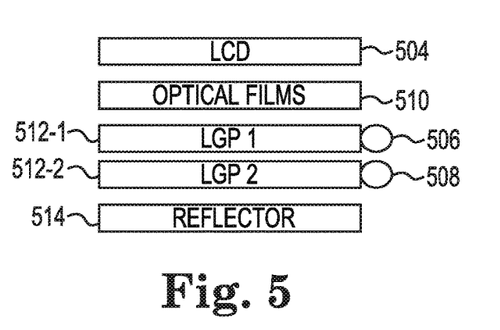

FIG. 5 illustrates another arrangement including an LCD 504 communicatively coupled to a backlight unit including a reflector 514, a first LGP 512-1, a second LGP 512-2, optical films 510, a wide gamut LED light set 506 and a narrow gamut LED light set 508. In the example illustrated in FIG. 5, wide gamut LED light set 506 and narrow gamut LED light set 508 are located on a same of different LGPs. For instance, wide gamut LED light set 506 is on LGP 512-1 and located on a same side as narrow gamut LED light set 508 located on LGP 512-2. In other some examples they can be reversed. For instance, wide gamut LED light set 506 can be on LGP 512-2 and located on a side opposite narrow gamut LED light set 408 located on LGP 512-1. This arrangement can allow for an easier implementation as compared to having LED light sets on a same side of a single LGP and can allow for a smaller boarder around an LCD as compared to having LED light sets on different sides of multiple LGPs.

Figure 6:
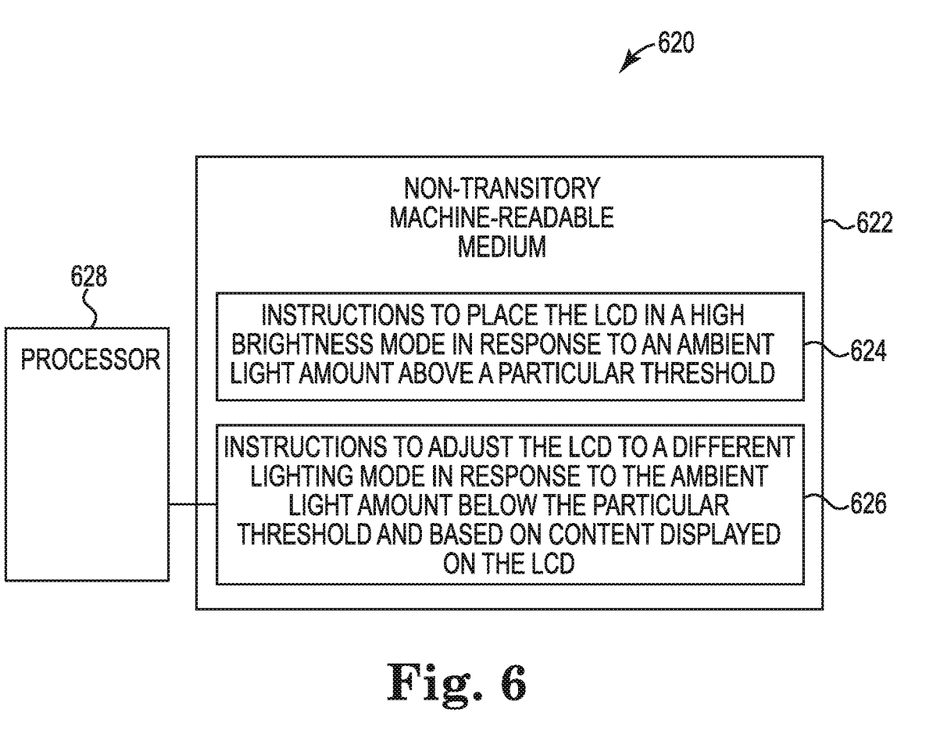
FIG. 6 illustrates a system for switching LCD lighting modes according to an example.

FIG. 6 illustrates a system 620 for switching LCD lighting modes according to an example. System 620 can be a device akin to device 100 as illustrated in FIG. 1. For instance, system 620 can be a computing device in some examples and can include a processor 628. System 620 can further include a non-transitory MRM 622, on which may be stored instructions, such as instructions 624 and 626. Although the following descriptions refer to a processor and a memory resource, the descriptions may also apply to a system with multiple processors and multiple memory resources. In such examples, the instructions may be distributed (e.g., stored) across multiple non-transitory MRMs and the instructions may be distributed (e.g., executed by) across multiple processors. Processor 628 and non-transitory MRM 622 can be akin to the processor and memory resource described with respect to FIG. 1.

Non-transitory MRM 622 may be electronic, magnetic, optical, or other physical storage device that stores executable instructions. Thus non-transitory MRM 622 may be, for example, Random Access Memory (RAM), an Electrically-Erasable Programmable Read-Only Memory (EEPROM), a storage drive, an optical disc, and the like on-transitory MRM 622 may be disposed within system 620, as shown in FIG. 6. In this example, the executable instructions 624, 626 may be "installed" on the device. Additionally and/or alternatively, non-transitory MRM 622 can be a portable, external or remote storage medium, for example, that allows system 620 to download the instructions 624, 626 from the portable/external/remote storage medium. In this situation, the executable instructions may be part of an "installation package". As described herein, non-transitory MRM 622 can be encoded with executable instructions for switching LCD lighting modes.

Instructions 624, when executed by a processor such as processor 628, can include instructions to turn on a wide gamut LED light set and a narrow gamut LED light set associated with an LCD to place the LCD in a high brightness lighting mode. For instance, in response to detecting an ambient light amount associated with the LCD being above a particular threshold, 5000 lux for example, the LCD can be placed in the high brightness mode. An example can include an LCD being outside in bright sunlight, meaning reflection may be a factor. Upon detection of the sunlight (e.g., high ambient light amount), the device can be placed in high brightness mode to improve visibility of content displayed on the LCD and reduce user eyestrain.

In some instances, the LCD can be placed in high brightness lighting mode in response to a remote command. For instance, the LCD can be configured remotely. In some examples, a user may request to upgrade a device to have a high brightness mode capability, and the LCD can be placed in high brightness lighting mode remotely.

Instructions 626, when executed by a processor such as processor 628, can include instructions to adjust the LCD to a different lighting mode using the wide gamut LED light set and the narrow gamut LED light set in response to the ambient light amount being below the particular threshold and based on detected content displayed on the LCD. For instance, if the LCD is in a low-lit office space, a high brightness mode may not be desired, as it may not improve user experience and may consumer more power.

For instance, the different lighting mode can include a narrow gamut lighting mode or a wide gamut lighting mode. The LCD can be adjusted to a narrow gamut lighting mode by turning on the narrow gamut LED light set and turning off (ore leaving turned off) the wide gamut LED light set in response to the detected content displayed on the LCD having a white content above a particular threshold. For instance, the threshold may be twenty percent. In such an example, if the white content is above 20 percent, the LCD can be adjusted to a narrow gamut lighting mode. The LCD can be adjusted to a wide gamut lighting mode by turning on the wide gamut LED light set and turning off (or leaving off) the narrow gamut LED light set in response to the detected content displayed on the LCD having a white content below the particular threshold. LCD adjustment based on white content is further discussed with respect to FIG. 8. In some instances, the LCD can be placed in the different lighting mode in response to a remote command. For instance, if the LCD is remotely managed, adjustments can be made remotely to the lighting modes.

Figure 7:
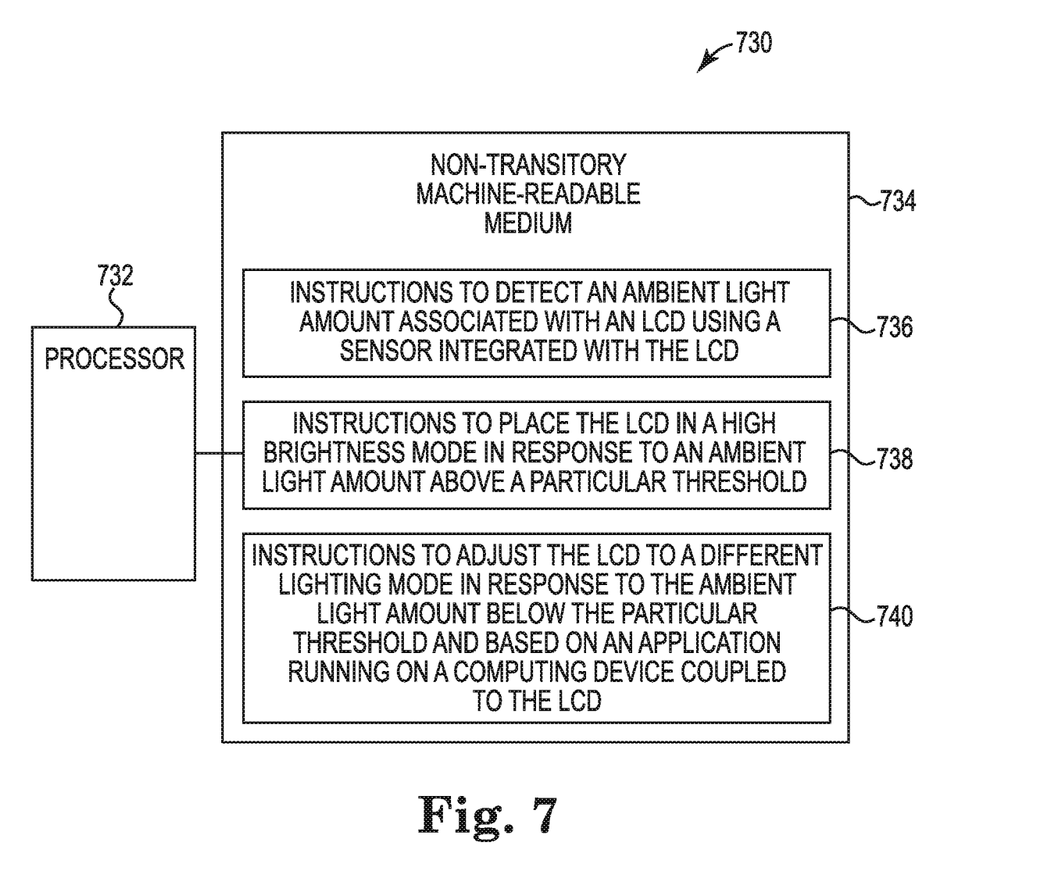
FIG. 7 illustrates another system for switching LCD lighting modes according to an example.

FIG. 7 illustrates another system 730 for switching LCD lighting modes according to an example. System 703 can be akin to device 100 and system 620 as described with respect to FIGS. 1 and 6, respectively. Processor 732 and non-transitory MRM 734 can be akin to processor 628 and non-transitory MRM 622 as described with respect to FIG. 6, as well as to the processor and the memory resource as described with respect to FIG. 1.

Instructions 736, when executed by a processor such as processor 732, can include instructions to detect an ambient light amount associated with an LCD using a sensor integrated with the LCD.

Instructions 738, when executed by a processor such as processor 732, can include instructions to turn on a wide gamut LED light set and a narrow gamut LED light set associated with the LCD to place the LCD in a high brightness lighting mode in response to the ambient light amount being above a particular threshold.

Instructions 738, when executed by a processor such as processor 732, can include instructions to adjust the LCD to a different lighting mode using the wide gamut LED light set and the narrow gamut LED light set and based on a detected application running on a computing device communicatively coupled to the LCD in response to the ambient light amount being below the particular threshold. The detected application, for instance, can have a preset lighting mode rule with which it is associated. For example, if a word processing application is detected, a preset lighting mode rule may instruct adjustment to a narrow gamut lighting mode, whereas a video viewing application may have an associated rule instructing adjustment to a wide gamut lighting mode. LCD adjustment based on a running application is further discussed with respect to FIG. 9.

For instance, the different lighting mode can be a narrow gamut lighting mode or a wide gamut lighting mode. The LCD can be adjusted to a narrow gamut lighting mode by turning on the narrow gamut LED light set and turning off the wide gamut LED light set in response to the detected application reaching a narrow gamut lighting mode threshold. The LCD can be adjusted to a wide gamut lighting mode by turning on the wide gamut LED light set and turning off the narrow gamut LED light set in response to the detected application reaching a wide gamut lighting mode threshold.

In some instances, the LCD can be controlled remotely. For instance, the high brightness lighting mode wide gamut lighting mode, the narrow gamut lighting mode, or the wide gamut lighting mode can be disabled in response to a remote command. For instance, if the LCD is remotely managed, a user may request a lighting mode turned on or off after a power level is reached (e.g., to conserve costs), and this request may be fulfilled remotely.

Figure 8:
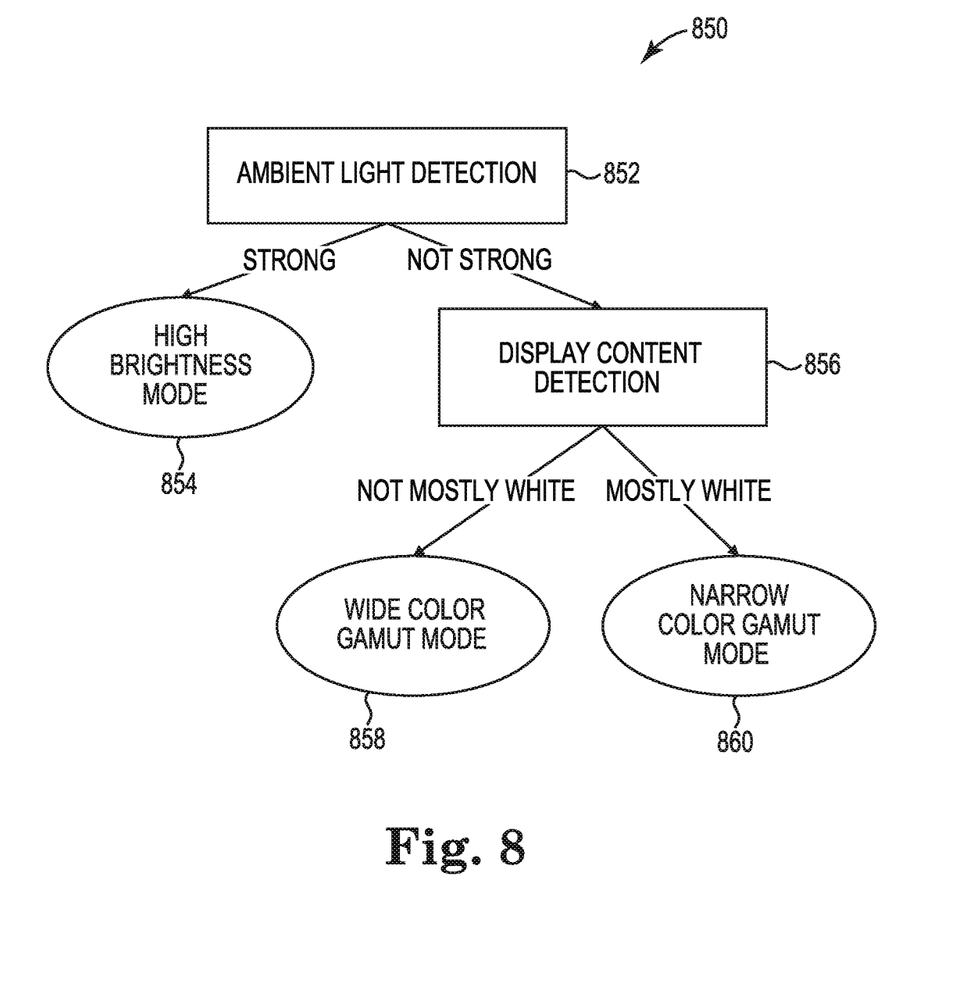
FIG. 8 illustrates a diagram of a method for switching LCD lighting modes according to an example.

FIG. 8 illustrates a diagram 850 of a method for switching LCD lighting modes according to an example. At 852, ambient light can be detected. For instance, an LCD can have an integrated sensor that can sense an amount of ambient light in the area of the LCD. If it is determined that the ambient light amount is strong, for instance if the LCD is located outside on a sunny day, the LCD can be placed in high brightness mode at 854. To do so, a wide gamut LED light set and a narrow gamut LED light set can be turned on. The sensor can sense continuously, periodically, or in other manners such that the LCD lighting mode can be switched between high brightness mode and going through a display content detection automatically. As used herein, continuously sensing can include sensing the ambient light as it changes (e.g., a light is turned on, sun comes out from the clouds, etc.), For instance, an ambient light amount can be detected as the environment changes. Periodic sensing can include sensing at particular intervals (e.g., sense every 15 minutes, etc.).

If it is determined that the ambient light amount is not strong, for instance if the LCD is located in a poorly lit office space, content displayed on the LCD can be detected at 856, If it is determined that content displayed on the LCD is mostly white, the LCD can be switched to a narrow color gamut mode at 860 by turning on a narrow gamut LED light set and turning off a wide color gamut LED light set (or leaving the wide color gamut LED light set off if it is already off). If it is determined that content displayed on the LCD is not mostly white, the LCD can be switched to a wide color gamut mode at 858 by turning on a wide gamut LED light set and turning off a narrow color gamut LED light set (or leaving the narrow color gamut LED light set off if it is already off).

"Mostly white" may be a threshold set by a manufacturer, user, or it may be remotely controlled. In some examples, "mostly white" can include a white content on the LCD of greater than 20 percent. The display content can be monitored continuously, periodically, or in other manners such that the LCD lighting mode can be switched between wide color gamut mode and narrow color gamut mode automatically.

Figure 9:
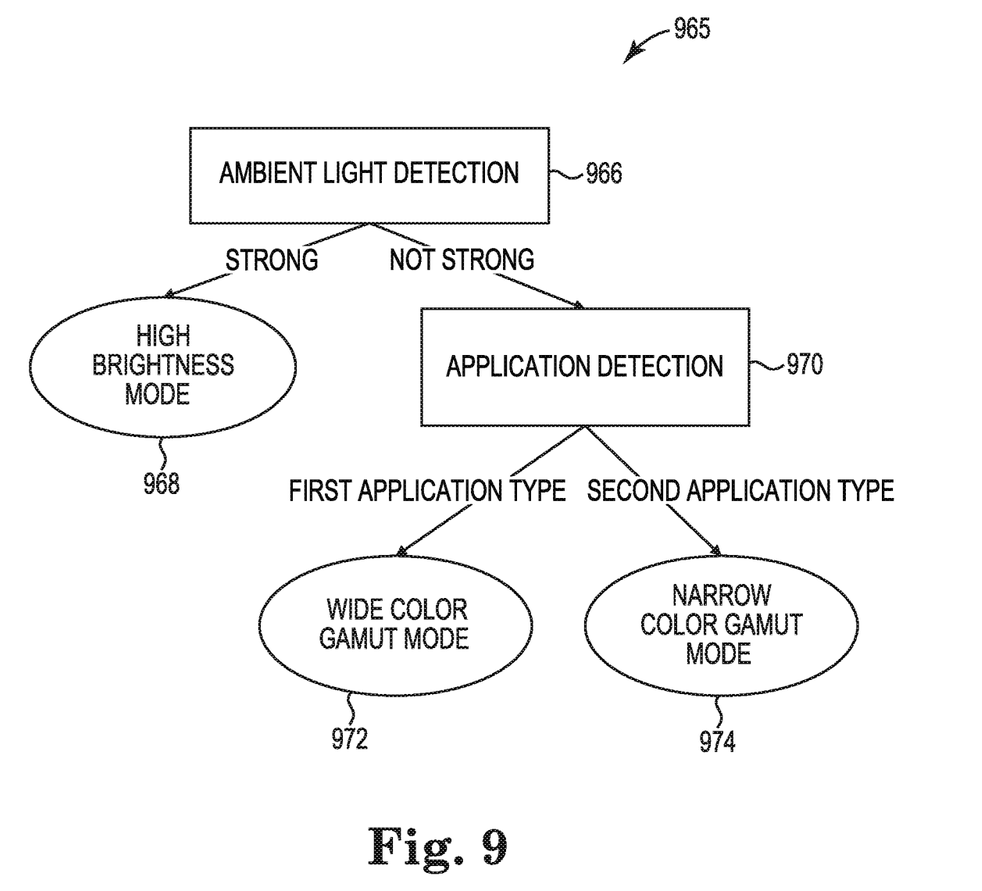
FIG. 9 illustrates another diagram of a method for switching LCD lighting modes according to an example.

FIG. 9 illustrates another diagram 965 of a method for switching LCD lighting modes according to an example. At 966, ambient light can be detected. For instance, an LCD can have an integrated sensor that can sense an amount of ambient light in the area of the LCD. If it is determined that the ambient light amount is strong, the LCD can be placed in high brightness mode at 968. To do so, a wide gamut LED light set and a narrow gamut LED light set can be turned on. The sensor can sense continuously, periodically, or in other manners such that the LCD lighting mode can be switched between high brightness mode and going through an application detection automatically.

If it is determined that the ambient light amount is not strong, an application running on a computing device communicatively coupled to the LCD can be detected at 970. If it is determined that the application is of a first application type where a wider color gamut may be desired (e.g., movie, animation, photo-editing application, etc.), the LCD can be switched to a wide color gamut mode at 972 by turning on a wide gamut LED light set and turning off a narrow color gamut LED light set (or leaving the narrow color gamut LED light set off if it is already off). If it is determined that the application is of a second application type where a narrow color gamut may be desired (e.g., word processing application), the LCD can be switched to a narrow color gamut mode at 974 by turning on a narrow gamut LED light set and turning off a wide color gamut LED light set (or leaving the wide color gamut LED light set off if it is already off). A narrow gamut color mode may be desired for power savings, for instance.

The application type can be monitored continuously, periodically, or in other manners such that the LCD lighting mode can be switched between wide color gamut mode and narrow color gamut mode automatically. For instance, particular application types may provide improved user experiences in a wide color gamut mode as compared to a narrow color gamut mode. If a photo editing or video viewing application is detected, for instance, a wide color gamut lighting mode may be desired such that a wider range of colors can be displayed while the application is in use. Alternatively, if a word processing application is detected, a narrow gamut lighting mode may be desired, as a wider range of colors may not improve the user experience by may increase a power consumption.

In some examples, particular applications can have preset rules such that they trigger a particular lighting mode. An administrator or user may set the rules or they may be controlled remotely. In some instance, the detected application can be considered along with display content (e.g., white content levels) to determine in which lighting mode to place the LCD.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature may refer to one or more of such elements and/or features.

What is claimed:

1. A device, comprising:
   a liquid crystal display (LCD);
   a wide gamut light-emitting diode (LED) light set to backlight the LCD;
   a narrow gamut LED light set to backlight the LCD; and
   a controller communicatively coupled to the LCD to:
      in response to detecting an ambient light amount associated with the LCD being above a particular threshold and a white content separate and distinct from the ambient light displayed on the LCD being below a different particular threshold, turn on the wide gamut LED light set and the narrow gamut LED light set to place the LCD in a high brightness lighting mode, wherein the different particular threshold comprises a white content on the LCD of 20 percent; and
      in response to detecting the ambient light amount being below the particular threshold and the white content being above the different particular threshold, adjust the LCD to a different lighting mode.

2. The device of claim 1, wherein the different lighting mode comprises a wide gamut lighting mode that comprises the wide gamut LED light set turned on and the narrow gamut LED light set turned off.

3. The device of claim 1, wherein the different lighting mode comprises a narrow gamut lighting mode that comprises the narrow gamut LED light set turned on and the wide gamut LED light set turned off.

4. The device of claim 1, further comprising:
   a light guide plate communicatively coupled to the LCD; and
   the wide gamut LED light set and the narrow gamut LED light set communicatively coupled to a same side of the light guide plate.

5. The device of claim 1, further comprising:
   a light guide plate communicatively coupled to the LCD; and
   the wide gamut LED light set and the narrow gamut LED light set communicatively coupled to different sides of the light guide plate.

6. The device of claim 1, wherein the controller is a remotely managed controller.

7. A non-transitory machine-readable medium comprising instructions executable by a processor to:
- in response to detecting an ambient light amount associated with a liquid crystal display (LCD) being above a particular threshold and a white content separate and distinct from the ambient light displayed on the LCD is below a different particular threshold, turn on a wide gamut light emitting diode (LED) light set and a narrow gamut LED light set associated with the LCD to place the LCD in a high brightness lighting mode,
   - wherein the different particular threshold comprises a white content on the LCD of 20 percent; and
- in response to detecting the ambient light amount being below the particular threshold and a white content separate and distinct from the ambient light displayed on the LCD is above the different particular threshold, adjust the LCD to a different lighting mode using the wide gamut LED light set and the narrow gamut LED light set and based on detected content displayed on the LCD.

8. The medium of claim 7, further comprising instructions executable by the processor to place the LCD in high brightness lighting mode in response to a remote command.

9. The medium of claim 7, further comprising instructions executable by the processor to adjust the LCD to the different lighting mode in response to a remote command.

10. A non-transitory machine-readable medium comprising instructions executable by a processor to:
- detect an ambient light amount associated with a liquid crystal display (LCD) using a sensor integrated with the LCD;
- detect a white content separate and distinct from the ambient light displayed on the LCD;
- in response to the ambient light amount being above a particular threshold and the white content below a different particular threshold, turn on a wide gamut light emitting diode (LED) light set and a narrow gamut LED light set associated with the LCD to place the LCD in a high brightness lighting mode,
   - wherein the different particular threshold comprises a white content on the LCD of 20 percent; and
- in response to the ambient light amount being below the particular threshold, the white content below the different particular threshold, and based on a detected application running on a computing device communicatively coupled to the LCD, adjust the LCD to a different lighting mode using the wide gamut LED light set and the narrow gamut LED light set.

11. The medium of claim 10, further comprising instructions executable by the processor to:
- adjust the LCD to a narrow gamut lighting mode by turning on the narrow gamut LED light set and turning off the wide gamut LED light set in response to the detected application reaching a narrow gamut lighting mode threshold; and
- adjust the LCD to a wide gamut lighting mode by turning on the wide gamut LED light set and turning off the narrow gamut LED light set in response to the detected application reaching a wide gamut lighting mode threshold.

12. The medium of claim 11, further comprising instructions executable by the processor to disable the high brightness lighting mode, the narrow gamut lighting mode, or the wide gamut lighting mode in response to a remote command.

13. The medium of claim 10, wherein the instructions executable by the processor to adjust the LCD to the different lighting mode based on the detected application comprises are executable by the processor to adjust the LCD to the different lighting mode based on a preset lighting mode rule for the detected application.

* * * * *